May 9, 1961  J. V. BLANKENBAKER  2,983,909
ALGEBRAIC SCALE COUNTER
Filed July 30, 1956  2 Sheets-Sheet 1
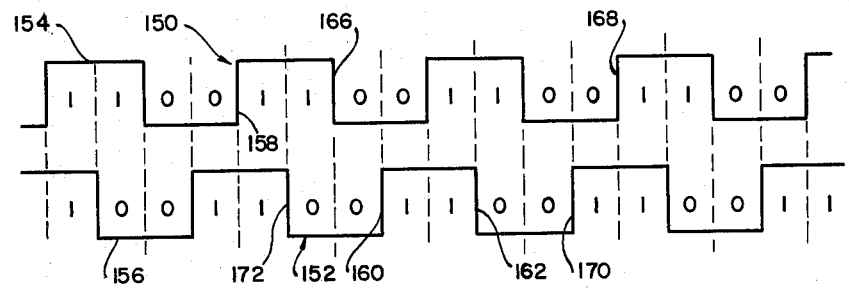
Fig. 2.
Fig. 3.
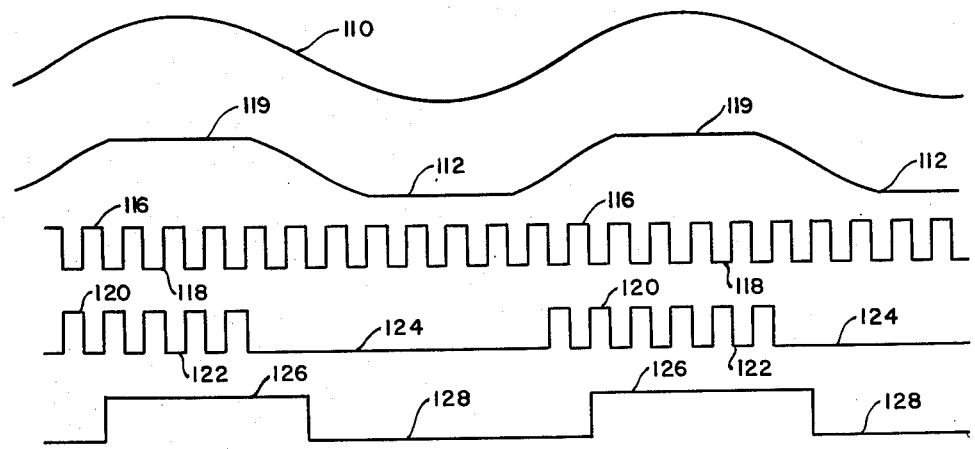
Fig. 4.
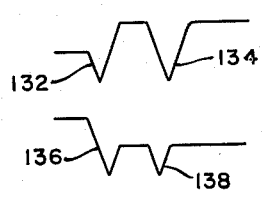
Inventor.
JOHN V. BLANKENBAKER,
By
Attorney.

May 9, 1961  J. V. BLANKENBAKER  2,983,909
ALGEBRAIC SCALE COUNTER
Filed July 30, 1956  2 Sheets-Sheet 2
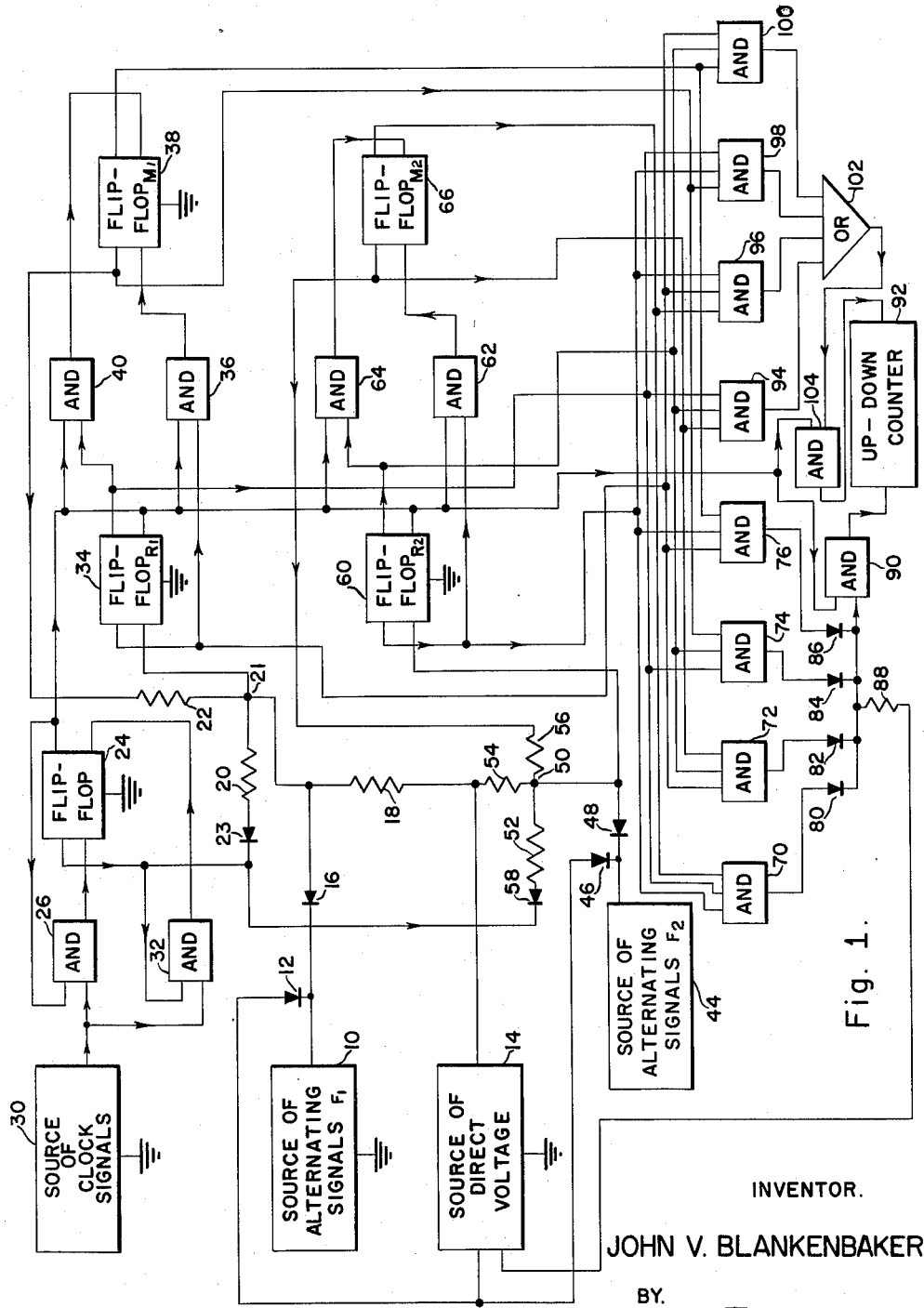
Fig. 1.
INVENTOR.
JOHN V. BLANKENBAKER,
BY
ATTORNEY.

United States Patent Office 2,983,909
Patented May 9, 1961

2,983,909

ALGEBRAIC SCALE COUNTER

John V. Blankenbaker, Albany, Oreg., assignor to Hughes Aircraft Company, Culver City, Calif., a corporation of Delaware Filed July 30, 1956, Ser. No. 600,811

7 Claims. (Cl. 340—205)

This invention relates to a system for indicating increments and more particularly to a system for indicating digital increments in a positive or negative direction. The invention is especially adapted to be used in determining increments as represented by changes in the polarity of alternating signals having a variable frequency.

In recent years, digital computers and data processing systems have been built for a wide variety of purposes. Digital computers have been built to solve complex mathematical problems which have previously been incapable of solution or which have been solved only after much mental effort. Data processing systems have been built to control such commercial operations as the inventory in large department stores and the deposits and withdrawals of money from banks. Data processing systems have also been built for such industrial purposes as to control the movements of a cutting tool in producing complex components such as cams.

When data processing systems are used to control the movements of a cutting tool, stages must be included to indicate units of movement of the cutting tool at any instant since the subsequent movements of the cutting tool are dependent upon the prior movements of the cutting tool. In one type of processing system for controlling the movements of a cutting tool, transducing members such as magnetic "read" heads are coupled to the cutting tool to move with the tool. The magnetic "read" heads are disposed in contiguous relationship to a channel having raised and grooved portions disposed in alternate relationship to one another. Signals are induced in the magnetic members as the members move past each of the raised and grooved portions. These signals represent integral increments of movement.

Certain problems are presented in data processing systems which use magnetic "read" heads and notched channels to register increments of movement. One problem results from the fact that the cutting tool and the associated magnetic "read" heads may move at different speeds at different instants of time. Actually, the rates of movement of the cutting tool and the associated magnetic "read" heads may vary over a considerable range of values at different instants of time. Another problem in such data processing systems results from the difficulty in distinguishing between positive and negative increments of movement. The positive increments of movement occur when the cutting tool and the associated magnetic "read" head move in one direction along the notched channel. The negative increments of movement occur when the cutting tool and the associated magnetic "read" heads move along the notched channel in an opposite direction.

This invention provides a system for indicating increments of movement of a cutting tool and the polarity of each such increment. The invention indicates such increments and the polarity of such increments even with considerable variations in the speed at which the cutting tool is moving at any instant. The invention includes a pair of magnetic "read" heads which are disposed in contiguous relationships to a notched channel. The "read" heads are displaced from each other by a distance corresponding substantially to one-quarter of the length of each notch and each raised portion.

As the first magnetic "read" head moves along the notched channel, first alternating signals are induced in the head. Similarly, second alternating signals are induced in the second magnetic "read" head as this head moves along the notched channel. The second alternating signals are displaced in phase by a particular angle such as 90° from the first alternating signals. By comparing the phases of the first and the second alternating signals at any instant, incremental units of movement and the polarities of such increments can be determined. Increments of positive polarities are indicated when one of the alternating signals changes from a first polarity to a second polarity at the time that the other alternating signals have a first particular polarity. Increments of negative polarity are indicated when one of the alternating signals changes from the first polarity to a second polarity at the time that the other alternating signal has the second polarity.

In the drawings:

Figure 1 is a circuit diagram, partly in block form, illustrating one embodiment of the invention.

Figure 2 illustrates the waveforms of a pair of alternating signals produced by the circuit diagram shown in Figure 1 and further illustrates the phase relationship between these alternating signals.

Figure 3 shows a plurality of curves which illustrate the output voltages from certain of the stages shown in Figure 1 and Figure 4 shows curves which illustrate on an amplified scale voltage waveforms produced at a pair of terminals in the embodiment shown in Figure 1.

In the embodiment of the invention shown in Figure 1, a source 10 of alternating signals is provided. The alternating signals may have a constant frequency or may have a frequency variable at any instant over a considerable range of values. The alternating signals may be produced by a wide variety of means. For example, the alternating signals may be produced by a motor the speed of which can vary over a substantial range. The alternating signals may also be induced in a magnetic head disposed in magnetic proximity to a notched track. The magnetic head may be moved relative to the notched track in accordance with the movements of a cutting member which is being automatically driven to produce components such as cams having complex shapes.

The alternating signals from the source 10 are introduced to the cathode of a diode 12 having its plate connected to a source 14 of direct voltage so as to receive a negative voltage from the source. The negative voltage introduced to the plate of the diode 12 from the source 14 may be in the order of 15 volts. The source 14 may be any suitable power supply for providing a direct voltage. Preferably, the source 14 may be constructed to provide voltages having stabilized amplitudes.

The alternating signals from the source 10 are also introduced to the cathode of a diode 16, the plate of which has common connections with first terminals of resistances 18, 20 and 22. The common connection between the resistances 18, 20 and 22 and the plate of the diode 16 is indicated in Figure 1 as being made at a terminal 21. The second terminal of the resistance 18 is connected to the source 14 to receive a suitable positive voltage such as +100 volts from the source. The resistance 18 may be provided with a suitable value such as approximately 78,000 ohms. A connection is made from the second terminal of the resistance 20 to the plate of a diode 23 having its cathode connected to the left output terminal of a flip-flop 24. The diodes 16 and 23 and the resistance 20 form a circuit commonly designated as an "and" circuit. This "and" network may be similar to other "and" networks shown in block form in Figure 1.

The flip-flop 24 may be any suitable type of bistable member. Since various types of bistable members are known in the art, the flip-flop 24 and other flip-flops in Figure 1 are shown in block form. The flip-flop 24 is provided with two input terminals and two output terminals. The input terminals of the flip-flop 24 and of the other flip-flops in Figure 1 will be respectively designated as the left and right and input terminals and are shown as being positioned in the lower left and right portions of the block representing the flip-flop. The output terminals of the flip-flop 24 and of the other flip-flops in Figure 1 are respectively designated as the left and right output terminals and are shown as being positioned in the upper left and right positions of the block representing the flip-flop. Special types of flip-flops such as those designated as "Manchester" flip-flops may also be used.

The left input terminal of the flip-flop 24 receives signals from an "and" network 26, the operation of which is controlled by signals from the right output terminal of the flip-flop 24 and by clock signals from a source 30. The clock signals from the source 30 preferably occur at periodic intervals and have a frequency greater than any of the frequencies which may be provided for the alternating signals from the source 10. For example, the clock signals from the source 30 may be obtained from a blocking oscillator or any other suitable type of oscillator. The clock signals may also be obtained from the clock channel of a magnetic drum such as has been normally included in various digital computers and data processing systems.

The clock signals from the source 30 are introduced to one terminal of an "and" network 32 as well as to one input terminal of the "and" network 26. The "and" network 32 also has signals applied to it from the left output terminal of the flip-flop 24. The output terminal of the "and" network 32 has a common connection with the right input terminal of the flip-flop 24 such that signals pass through the "and" network to trigger the flip-flop to the false state of operation.

In addition to being connected to the resistances 18, 20 and 22 and the plate of the diode 23, the terminal 21 is connected to the left input terminal of a flip-flop 34. The right input terminal of the flip-flop 34 has signals applied to it from the right output terminal of the flip-flop 24. The signals from the right output terminal of the flip-flop 24 also pass to an input terminal of an "and" network 36 having another input terminal connected to the left output terminal of the flip-flop 34. A connection is made from the output terminal of the "and" network 36 to the left input terminal of the flip-flop 38. In like manner, the right input terminal of the flip-flop 38 is connected to the output terminal of an "and" network 40, the input terminals of which receive signals from the right output terminals of the flip-flops 24 and 34.

In addition to the source 10 of alternating signals, a source 44 of alternating signals is provided. The source 44 may be constructed in a manner similar to the source 10 to provide signals having a variable frequency at different instants of time. The source 44 is adapted to provide at any instant signals having the same frequency as the frequency of the signals from the source 10. However, the signals from the source 44 have a particular phase displacement with respect to the signals from the source 10. Preferably, the signals from the source 44 lead the signals from the source 10 by a particular angle such as approximately 90 degrees. As will become more apparent subsequently, other phase relationships between the signals from the sources 10 and 44 may be provided, especially if certain errors in the output indications can be tolerated.

The alternating signals from the source 44 are applied to the cathode of a diode 46 having its plate connected to the same negative terminal of the source 14 as the plate of the diode 12. The signals from the source 44 also pass to the cathode of a diode 48, the plate of which is connected to resistances 52, 54 and 56. The resistances 52, 54 and 56 are provided with values corresponding respectively to those provided for the resistances 18, 20 and 22. The resistance 52 is connected to the plate of a diode 58, the cathode of which has signals applied to it from the left output terminal of the flip-flop 24. The resistance 54 has a positive voltage applied to it from the same terminal of the source 14 as the resistance 18.

The common terminal between the resistances 52, 54 and 56 may be indicated at 50 in Figure 1. The signals produced on the common terminal 50 are introduced to the left input terminal of a flip-flop 60 to trigger the flip-flop to the true state of operation. The flip-flop 60 becomes triggered to the false state of operation by the introduction of signals to the right input terminal of the flip-flop from the right output terminal of the flip-flop 24.

The voltages on the left and right output terminals of the flip-flop 60 are respectively introduced to input terminals of "and" networks 62 and 64. Connections are made to second input terminals of the "and" networks 62 and 64 from the right output terminal of the flip-flop 24. The signals from the "and" networks 62 and 64 respectively pass to the left and right input terminals of a flip-flop 66. The resultant output voltages produced on the left output terminal of the flip-flop 66 are introduced through the resistance 56 to the common terminal 50 for reasons which will be described in detail subsequently.

The signals from the flip-flops 24, 34, 38, 60 and 66 are introduced to "and" networks in particular patterns to provide signals representing positive and negative increments in the alternating signals from the sources 10 and 44. For example, signals are introduced to an "and" network 70 from the left output terminal of the flip-flop 60 and from the right output terminals of the flip-flops 34 and 66. An "and" network 72 receives the signals on the left output terminals of the flip-flops 34 and 66 and the right output terminal of the flip-flop 60. An "and" network 74 has input terminals connected to the left output terminal of the flip-flop 38 and the right output terminals of the flip-flops 34 and 60. Connections are made to input terminals of an "and" network 76 from the left output terminals of the flip-flops 34 and 60 and the right output terminal of the flip-flop 38.

The signals from the "and" networks 70, 72, 74 and 76 respectively pass to the plates of diodes 80, 82, 84 and 86. The cathodes of the diodes 80, 82, 84 and 86 are connected to one terminal of a resistance 88, the other terminal of which is adapted to receive a suitable negative voltage such as approximately —100 volts from the source 14. The resistance 88 may be provided with a suitable value such as approximately 55,000 ohms. The resistance 88 and the diodes 80, 82, 84 and 86 form a stage commonly designated in the art as an "or" network. The output signals from the "or" network are produced on the cathodes of the diodes 80, 82, 84 and 86. The signals produced on the cathodes of the diodes 80, 82, 84 and 86 are introduced to one input terminal of an "and" network 90 having another input terminal connected to the right output terminal of the flip-flop 24. The signals from the "and" network 90 in turn pass to an up-down counter indicated in block form at 92 in Fig. 1. The counter 92 is shown in block form since it is known in various embodiments to persons skilled in the art. In certain of these embodiments, the counter 92 is formed from a plurality of flip-flops which are interrelated by a plurality of "and" and "or" networks formed from diodes connected in particular logical relationships. The counter 92 is adapted to count upwardly upon the introduction of signals from the "and" network 90.

"And" networks 94, 96, 98 and 100 are electrically associated with one another in a manner similar to the association between the "and" networks 70, 72, 74 and 76. Input terminals of the "and" network 94 are connected to the left output terminal of the flip-flop 66 and the right output terminals of the flip-flops 34 and 60. Connections are made to input terminals of the "and" network 96 from the left output terminals of the flip-flops 34 and 60 and from the right output terminal of the flip-flop 66. The "and" network 98 has signals applied to it from the left output terminals of the flip-flops 38 and 60 and the right output terminal of the flip-flop 34. The "and" network 100 receives at its input terminals signals from the left output terminal of the flip-flop 34 and the right output terminals of the flip-flops 38 and 60.

The signals from the "and" networks 94, 96, 98 and 100 pass to an "or" network 102 which may be constructed in a manner similar to that described above for the "or" network formed by the diodes 80, 82, 84 and 86 and the resistance 88. The signals introduced to the "or" network 102 pass through the "or" network to an input terminal of an "and" network 104 having another input terminal connected to the right output terminal of the flip-flop 24. The output signals from the "and" network 104 are introduced to a second terminal of the up-down counter 92 to trigger the counter in a direction for reducing the count.

The source 10 is adapted to provide signals indicated at 110 in Figure 3. Although the signals 110 in Figure 3 are shown as being sinusoidal and at a constant frequency, the signals may have any wave shape and may be variable in frequency. During the negative swing of the alternating signals 110, the amplitude of the signals may become more negative than a particular value represented by the voltage introduced to the plate of the diode 12 from the source 14. When the amplitude of the signals 110 falls below the particular value, current flows through a circuit including the source 14, the diode 12 and the source 10. This causes the voltage at the cathode of the diode 12 to have the same value as the potential introduced to the plate of the diode from the source 14. In this way, the amplitude of the alternating signals from the source 10 cannot decrease below a particular negative value. This is indicated at 112 in Figure 3.

As previously described, the clock signals from the source 30 have a frequency higher than the frequency of the alternating signals from the source 10. The frequencies of the signals from the sources 10 and 30 may have an integral relationship or any other relationship which would not necessarily be an integral relationship. The clock signals from the source 30 are introduced to the "and" networks 26 and 32. The clock signals pass through the "and" network 26 when a relatively high voltage is produced on the right output terminal of the flip-flop 24. After passing through the "and" network 26, the clock signals are introduced to the left input terminal of the flip-flop 24 to trigger the flip-flop into the true state of operation. This is represented by a relatively high voltage on the left output terminal of the flip-flop 24 and a relatively low voltage on the right output terminal of the flip-flop. The relatively high voltages produced on the left output terminal of the flip-flop 24 are indicated at 116 in Figure 3.

Relatively high voltages are produced on the left output terminal of the flip-flop 24 in accordance with the logical equation:

$$t = \bar{T}C \tag{1}$$

where $t$ = the introduction of a triggering signal to the left input terminal of the flip-flop 24;
$\bar{T}$ = a relatively high voltage on the right output terminal of the flip-flop 24; and
$C$ = clock signals from the source 30.

The relatively high voltage on the left output terminal of the flip-flop 24 is introduced to the "and" network 32 to prepare the "and" network for the passage of clock signals from the source 30. When the "and" network 32 becomes prepared for activation, the next clock signal from the source 30 passes through the "and" network to the right input terminal of the flip-flop 24. This signal triggers the flip-flop 24 to the false state of operation, as represented by a relatively high voltage on the right output terminal of the flip-flop 24 and a relatively low voltage on the left output terminal of the flip-flop. The relatively low voltages produced on the left output terminal of the flip-flop 24 are indicated at 118 in Figure 3.

The flip-flop 24 becomes triggered to its false state of operation in accordance with the following logical equation:

$$\bar{t} = TC \tag{2}$$

where $\bar{t}$ = the introduction of a triggering signal to the right input terminal of the flip-flop 24;
$T$ = the production of a relatively high voltage on the left output terminal of the flip-flop 24; and
$C$ = a clock signal from the source 30.

Because of the relatively high voltage produced on the right output terminal of the flip-flop 24, the "and" network 26 becomes prepared to pass the next clock signal from the source 30. In this way, the flip-flop 24 becomes alternately triggered to its true and false states of operation upon the introduction of successive clock signals. This causes the voltages 116 of high amplitude and the voltages 118 of low amplitude to be alternately produced on the left output terminal of the flip-flop 24. The alternate signals of high and low amplitude on the left output terminal of the flip-flop 24 have a frequency one half as great as the frequency of the clock signals from the source 30.

The signals produced on the left output terminal of the flip-flop 24 are introduced to the cathode of the diode 23. When the voltage 116 of high amplitude is produced on the left output terminal of the flip-flop 24, this voltage prevents current from flowing through a circuit including the voltage source 14, the resistance 18, the resistance 20, the diode 23 and the flip-flop 24, or at least minimizes any flow of current through this circuit. During the time that a relatively high voltage is also introduced to the cathode of the diode 16 from the source 10, no current or at least a minimum current is able to flow through a circuit including the voltage source 14, the resistance 18, the diode 16 and the source 10. Because of this, a relatively high voltage approaching the potential from the source 14 is produced at the terminal 21 upon the simultaneous introduction of high voltages to the cathodes of the diodes 16 and 23.

A voltage approaching the potential of the source 14 is produced at the terminal 21 upon the simultaneous introduction of voltages of high amplitude to the cathodes of the diodes 16 and 23 even though the amplitude of the signals from the source 10 may rise above a particular value such as the potential from the source 14. This results from the fact that current is not able to flow through the diode 16 when the positive amplitude of the alternating signals 110 introduced to the cathode of the diode 16 is greater than the amplitude of the positive potential introduced to the plate of the diode. The action of the diode 16 in limiting the positive potential of the alternating signals is illustrated at 119 in Figure 3.

Upon the occurrence of the next clock signal from the source 30, a relatively low voltage is produced on the left output terminal of the flip-flop 24 as previously described. This low voltage is introduced to the cathode of the diode 23 to produce a flow of current through a circuit including the source 14, the resistance 18, the resistance 20, the diode 23 and the flip-flop 24. Because of the voltage produced across the resistance 18 by the flow of current through the resistance, a voltage drop occurs at the terminal 21.

The drop in voltage at the terminal 21 is introduced to the left input terminal of the flip-flop 34 to trigger the flip-flop into the true state of operation, as represented by a relatively high voltage on the left output terminal of the flip-flop. The flip-flop 34 is triggered to its true state of operation in accordance with the following logical equation:

$$r_1 = F_1 T \qquad (3)$$

where $r_1$ = the introduction of a triggering signal to the left input terminal of the flip-flop 34;
$F_1$ = the introduction of a signal of positive amplitude from the source 10, this signal being clamped as indicated at 119 in Figure 3; and
$T$ = a signal of high amplitude from the left output terminal of the flip-flop 24.

In the next cycle of clock signals from the source 30, the flip-flop 24 becomes triggered to the false state of operation in accordance with the logic expression in Equation 2. This causes a relatively high voltage to be introduced to the right input terminal of the flip-flop 34. At the end of this clock signal, the flip-flop 24 again becomes triggered to the true state such that the voltage on the right output terminal of the flip-flop changes from a high amplitude to a low amplitude.

The decrease in the amplitude of the voltage on the right output terminal of the flip-flop 24 causes a triggering signal to be introduced to the right input terminal of the flip-flop 34. This signal triggers the flip-flop 34 to the false state of operation, as represented by a relatively high voltage on the right output terminal of the flip-flop and a relatively low voltage on the left output terminal of the flip-flop. The flip-flop 34 becomes triggered to the false state of operation in accordance with the logical equation $$\bar{r}_1 = \bar{T} \qquad (4)$$

where $\bar{r}_1$ = the introduction of a triggering signal to the right input terminal of the flip-flop 34; and
$\bar{T}$ = a relatively high voltage on the right output terminal of the flip-flop 24.

During the time that the alternating signals 110 have a positive polarity and an amplitude above a particular value, the flip-flop 34 becomes triggered to its true state in one clock cycle and becomes triggered to its false state in the next clock cycle. This is in accordance with the logic expressed in Equations 3 and 4. In this way, signals 120 of high amplitude and signals 122 of low amplitude are alternately produced on the left output terminal of the flip-flop 34. The signals 120 and 122 and other signals produced by the flip-flop 34 may be considered as first control signals. The alternate production of the signals 120 and 122 continues until the amplitude of the alternating signals 110 decreases below the particular positive value. The flip-flop 34 then remains in its false state during the time that the negative half cycles of the alternating signals 110 are being presented. This is indicated at 124 in Figure 3.

The positive voltage produced on the left output terminal of the flip-flop 34 is introduced to the "and" network 36 to prepare the "and" network for operation. The "and" network 36 then passes a signal in the clock cycle in which a relatively high voltage simultaneously occurs on the right output terminal of the flip-flop 24. The signal passing through the "and" network 36 is introduced to the left input terminal of the flip-flop 38 to trigger the flip-flop to the true state of operation.

When the flip-flop 38 is triggered to the true state of operation, a relatively high voltage is produced on the left output terminal of the flip-flop, as indicated at 126 in Figure 3. Such a voltage is produced in accordance with the logical equation:

$$m_1 = R_1 \bar{T} \qquad (5)$$

where $m_1$ = the introduction of a triggering signal to the left input terminal of the flip-flop 38; and
$R_1$ = the production of a high voltage on the left output terminal of the flip-flop 34.

The voltages such as the voltage 126 produced on the output terminals of the flip-flop 38 may be considered as second control signals.

It has been explained previously that each of the flip-flops 24, 34 and 38 becomes triggered from one state of operation to the other at the time that a negative signal is introduced to the flip-flop. Since the right input terminal of the flip-flop 38 is connected to the output terminal of the "and" network 40, the flip-flop 38 becomes triggered to its false state when a negative signal passes through the "and" network 40. This should occur at the time that the voltage on the right output terminal of the flip-flop 24 changes from a high amplitude to a low amplitude. However, a signal can pass through the "and" network 40 from the flip-flop 24 only during the time that a relatively high voltage is simultaneously produced on the right output terminal of the flip-flop 34.

Since the production of a high voltage on the right output terminal of the flip-flop 34 is also controlled by the signals from the right output terminal of the flip-flop 24, a signal is not able to pass through the "and" network 40 unless the flip-flop 34 has been previously triggered to its false state of operation. This cannot occur when the signals 120 and 122 are being alternately produced in the flip-flop 34 during the occurrence of successive clock cycles. In this way, the flip-flop 38 remains in its true state during the time that the signals 120 and 122 are alternately produced on the left output terminal of the flip-flop 34. In other words, the flip-flop 38 cannot become triggered to its false state unless the flip-flop 34 remains in its false state for at least two successive clock cycles.

When the flip-flop 34 remains in its false state of operation for at least two consecutive clock cycles, a relatively high voltage occurs on the right output terminal of the flip-flop 34 at the time that the voltage on the right output terminal of the flip-flop 24 is changing from a high amplitude to a low amplitude. This causes a signal to pass through the "and" network 40 to the right input terminal of the flip-flop 38. The signal triggers the flip-flop 38 to the false state of operation, as represented by a relatively high voltage on the right output terminal of the flip-flop and a relatively low voltage on the left output terminal of the flip-flop. The relatively low voltage on the left output terminal of the flip-flop 38 is indicated at 128 in Figure 3. The flip-flop 38 becomes triggered to the false state of operation in accordance with the logical equation:

$$\bar{m}_1 = \bar{T} \bar{R}_1 \qquad (6)$$

where $\bar{m}_1$ = the introduction of a triggering signal to the right input terminal of the flip-flop 38; and
$\bar{R}_1$ = the production of a high voltage on the right output terminal of the flip-flop 34.

At some time during the rise in amplitude of the alternating signals 110, the flip-flop 34 is first triggered to the true state of operation in accordance with the logic expressed in Equation 3. After at least one more cycle of clock signals, the flip-flop 38 becomes triggered to its true state of operation in accordance with the logic expressed in Equation 5. This may also be seen from the curves shown in Figure 3.

When the flip-flop 38 becomes triggered to the true state of operation, a relatively high voltage is introduced from the left output terminal of the flip-flop 38 through the resistance 22 to the terminal 21. The output voltage fed back from the flip-flop 38 to the terminal 21 helps in maintaining the terminal at a high amplitude. In this way, a negative triggering signal having a large amplitude is produced at the terminal 21 when the voltage on the left output terminal of the flip-flop 24 changes from a high amplitude to a low amplitude. This may be seen by a comparison in the amplitudes of two successive triggering signals 132 and 134 produced at the terminal 21 and indicated in Figure 4. The signal 132 is produced during the time that the flip-flop 38 is still in its false state of operation and the signal 134 is produced during the time that the flip-flop 38 is in its true state of operation. The signal 134 has a greater amplitude than the signal 132 since it starts from a higher positive amplitude than the signal 132. In this way, the flip-flop 38 operates to facilitate the triggering of the flip-flop 34 to the true state of operation upon the occurrence of alternate clock signals during the time that the alternating signals 110 have a positive amplitude above a particular value.

It has been previously described that the flip-flop 38 is triggered to its false state of operation when the amplitude of the alternating signals 110 falls below a particular positive value. The triggering of the flip-flop 38 to its false state of operation is indicated at 128 in Figure 3. When the flip-flop 38 is triggered to its false state of operation, a relatively low voltage is introduced from the left output terminal of the flip-flop through the resistance 22 to the terminal 21. This low voltage causes the magnitude of the positive voltage at the terminal 21 to decrease even though a constant voltage is introduced to the terminal from the source 14. Because of the decrease in the magnitude of the voltage at the terminal 21, a decrease is obtained in the amplitude of the negative signals produced at the terminal when the voltage on the left output terminal of the flip-flop 24 changes from a high amplitude to a low amplitude.

The decrease in the amplitude of the negative signals at the terminal 21 may be seen from a comparison of signals 136 and 138 in Figure 4. The signals 136 are produced during the time that the flip-flop 38 is in its true state and the signals 138 are produced during the time that the flip-flop 38 is in its false state. By decreasing the amplitude of the signals in the terminal 21 from that illustrated by the signals 136 to that illustrated by the signals 138, the amplitude of the negative signals becomes too low to trigger the flip-flop 34 to the true state of operation. This is desirable since the flip-flop 34 should remain in its false state of operation during the time that the amplitude of the alternating signals is below the particular positive value. This is indicated at 124 in Figure 3.

It should be appreciated that the "and" network formed by the diodes 16 and 23 and the resistances 18, 20 and 22 is a special type of circuit. This circuit is included to insure that the flip-flop 34 and indirectly the flip-flop 38 have proper states of operation at all times. Actually, a conventional type of "and" network can also be used to control the operation of the flip-flop 34 and indirectly the operation of the flip-flop 38. This conventional "and" network would not have to have any features of feedback from the flip-flop 38 to the flip-flop 34.

The flip-flops 60 and 66 and their associated stages operate in a manner similar to that described above for the flip-flops 34 and 38 and the stages associated with the flip-flops 34 and 38. For example, the flip-flop 60 becomes triggered to the true state of operation when relatively high voltages are simultaneously introduced from the source 44 of alternating signals and the left output terminal of the flip-flop 24. The flip-flop 60 becomes triggered to its true state in accordance with the operation of the "and" network formed by the diodes 48 and 58 and the resistances 52 and 54. The flip-flop 60 becomes triggered to its true state of operation in accordance with the logical equation:

$$r_2 = F_2 T \qquad (7)$$

where $r_2$ = the introduction of a triggering signal to the left input terminal of the flip-flop 60;
$F_2$ = a signal of positive amplitude from the source 44; and the other terms have previously been defined.

The flip-flop 60 becomes triggered to its false state of operation upon the introduction of a relatively high voltage from the right output terminal of the flip-flop 24. The flip-flop 60 becomes triggered to its false state of operation in accordance with the logical equation:

$$\bar{r}_2 = \bar{T} \qquad (8)$$

where $\bar{r}_2$ = the introduction of a triggering signal to the right input terminal of the flip-flop 60.

It will be seen from the logic expressed in Equations 7 and 8 that the flip-flop 60 becomes triggered into a pattern of operation corresponding to that described above for the flip-flop 34. In this way, the flip-flop 60 is provided with signals at its output terminals corresponding to that indicated at 120 and 122 during the portions of the signals from the source 44 above a particular positive amplitude and with signals corresponding to the signals 124 when the signals from the source 44 have an amplitude below the particular positive value. Because of the displacement in phase between the alternating signals from the sources 10 and 44, the signals produced by the flip-flop 60 are displaced by a corresponding angle from the signals produced by the flip-flop 34.

A signal passes through the "and" network 62 in Figure 1 every time that relatively high voltages are simultaneously introduced to the "and" network from the left output terminal of the flip-flop 60 and the right output terminal of the flip-flop 24. The signal passes through the "and" network 62 to the left input terminal of the flip-flop 66 to trigger the flip-flop to the true state of operation. Signals pass to the left input terminal of the flip-flop 66 in accordance with the logical equation:

$$m_2 = R_2 \bar{T} \qquad (9)$$

where $m_2$ = the introduction of a triggering signal to the left input terminal of the flip-flop 66; and
$R_2$ = the production of a relatively high voltage on the left output terminal of the flip-flop 60.

As will be seen, the logic expressed in Equation 9 for the flip-flop 66 corresponds to the logic expressed in Equation 5 for the flip-flop 38.

The flip-flop 66 becomes triggered to the false state of operation in a pattern corresponding to that described above for the flip-flop 38. The logic controlling the triggering of the flip-flop 66 to the false state of operation may be expressed as:

$$\bar{m}_2 = \bar{T} \bar{R}_2 \qquad (10)$$

where $\bar{m}_2$ = the introduction of a triggering signal to the right input terminal of the flip-flop 66; and
$\bar{R}_2$ = the production of a relatively high voltage on the right output terminal of the flip-flop 60.

As previously described, the alternating signals produced by the source 10 may have a variable frequency at different instants of time. The signals produced by the source 10 are indicated in general at 150 in Figure 2. The alternating signals 150 are provided with rectangular characteristics in Figure 2 to facilitate an understanding as to the operation of certain stages which will be described in detail subsequently. The signals 150 are also shown in Figure 2 as having a substantially constant frequency to further promote an understanding as to the operation of certain stages. Similarly, signals generally indicated at 152 in Figure 2 are shown as being produced by the source 44. The signals 152 are shown in Figure 2 as having substantially rectangular characteristics and a substantially constant frequency for the same reasons as the signals 150.

As will be seen in Figure 2, the signals 150 are provided with a particular phase displacement relative to the signals 152. This phase displacement is shown in Figure 2 as being approximately 90 degrees since it is believed that such a phase displacement will cause output indications of optimum accuracy to be produced by the output stages, as will be described in detail subsequently. It should be appreciated, however, that other phase displacements than 90 degrees may be provided between the signals 150 and 152, especially when decreases in the accuracy of the output signals can be tolerated. This will become more apparent subsequently.

The signals 150 and 152 may be produced by physical movements of a pair of transducers. For example, a pair of transducers such as magnetic "read" heads may be mechanically coupled to a cutting member for movement with the member. The cutting member and the magnetic "read" heads may be included in data processing apparatus for automatically controlling the movements of the cutting member to produce components such as cams having complex shapes. The magnetic "read" heads may be moved in synchronization with the cutting member past a track having notches and raised portions alternately disposed relative to one another. The first magnetic "read" head may be displaced from the second magnetic "read" head by a distance corresponding substantially to one fourth of the length of each notch and raised portion in the track.

Upon the movements of the first magnetic "read" head past the notches and raised portions in the track, signals corresponding to the alternating signals 150 in Figure 2 or to the signals 110 in Figure 3 are induced in the head. The signals in the magnetic "read" head have a high amplitude as the head moves past a raised portion. In like manner, signals having a low amplitude are induced in the magnetic "read" head as the head moves past the notches. The signals of high amplitude induced in the head correspond to digital indications of "1" and the signals of low amplitude correspond to indications of "0." The indications of "1" and "0" for the signals 150 are shown in Figure 2 at positions contiguous to the corresponding signals.

In a like manner, the signals 152 are provided with indications of "1" and "0" in accordance with the movement of the second magnetic "read" head past the raised portions and the notches in the track. The indications of "1" and "0" for the signals 150 and 152 are produced at any instant at a frequency dependent upon the rate of movement of the magnetic heads past the notches and raised portions. Apparatus suitable for use in producing the signals 150 and 152 and including first and second magnetic "read" heads is described in detail and claimed in copending application serial No. 595,251 filed July 2, 1956 by John V. Blankenbaker.

It will be seen from the above discussions that the movements of the cutting tool and the magnetic "read" heads may occur in forward or reverse directions. For this reason, the signals 150 and 152 may be considered as being produced in a forward direction or in a reverse direction. This system operates to detect each increment of movement in the forward or reverse directions as represented by an angular displacement of 90 degrees in each of the signals 150 and 152. The system also operates to indicate whether the displacement in the signals 150 and 152 is occurring in a forward or reverse direction.

At one instant of time, the signals 150 may have an indication of "1" as indicated at 154 in Figure 2 and the signals 152 may have an indication of "0" as indicated at 156 in that figure. When indications of "1" and "0" are simultaneously produced for the signals 150 and 152, a positive increment is produced at the time that the signal 150 changes from an indication of "1" to an indication of "0." It will be noted that the signal 152 still has an indication of "0" at the time that the signal 150 is changing from an indication of "1" to an indication of "0."

As previously described, an indication of "0" for the signals 152 is represented by a relatively high voltage on the right output terminal of the flip-flop 60. Since the signals 150 are changing from an indication of "1" to an indication of "0" to represent the positive increment discussed in the previous paragraph, a relatively high voltage is produced on the right output terminal of the flip-flop 34. However, a relatively high voltage is maintained on the left output terminal of the flip-flop 38 during the time that the flip-flop 34 is changing from its true state of operation to its false state of operation. This high voltage is maintained on the left output terminal of the flip-flop 38 for an additional clock cycle in accordance with the logic expressed above in Equation 6. This may be seen in Figure 3 by a comparison in the amplitudes of the signals 124 and 126 at the end portion of each of the signals 126.

It will be seen from the previous paragraph that relatively high voltages are simultaneously produced on the left output terminals of the flip-flop 38 and the right output terminals of the flip-flops 34 and 60 to indicate a positive increment. When such high voltages are simultaneously produced, a positive signal passes through the "and" network 74. This positive signal causes a positive voltage to be introduced to the plate of diode 84 such that current flows through a circuit including the diode, the resistance 88 and the voltage source 14. This flow of current causes a positive voltage to be produced across the resistance 88. This positive voltage is introduced to the "and" network 90. At a proper time in the clock cycles as represented by a high voltage on the right output terminal of the flip-flop 24, the positive signal produced across the resistance 88 passes through the "and" network 90 to the up-down counter 92. This signal triggers the counter 92 to increase by an integer the indications provided by the counter. For example, the indications provided by the counter 92 may increase from a value of "3" to a value of "4" upon the introduction of a signal to the counter from the "and" network 90.

Signals pass through the "and" network 74, the diode 84 and the "and" network 90 to the counter 92 in accordance with the logical equation:

$$z = M_1 \bar{R}_1 \bar{R}_2 \bar{T} \tag{11}$$

where $z$ = the introduction of a triggering signal to the counter 92 in a direction for increasing the indicated count by one integer; and the other terms have previously been defined.

A positive increment is also obtained when the signal 150 changes from an indication of "0" to an indication of "1" at the time that the signal 152 still has an indication of "1." A change in the signal 150 from an indication of "0" to an indication of "1" to represent a positive increment is indicated at 158 in Figure 2. At the time that the signal 150 is changing from an indication of "0" to an indication of "1," the flip-flop 38 still is in a false state of operation because of the time lag of at least one clock cycle in the control exerted by the flip-flop 34 over the flip-flop 38. In this way, the simultaneous occurrence of high voltages on the left output terminals of the flip-flops 34 and 60 and on the right output terminal of the flip-flop 38 represents a positive increment.

A signal passes through the "and" network 76 upon the simultaneous occurrence of relatively high voltages on the left output terminals of the flip-flops 34 and 60 and on the right output terminal of the flip-flop 38. This signal causes a relatively high voltage to be produced on the cathode of the diode 86 in a manner similar to that described above. The signal then passes through the "and" network 90 at an optimum time in the clock cycles and triggers the counter 92 to increase the indications in the counter by an integer. The counter 92 becomes triggered in a positive direction by the passage of signals through the "and" networks 76 and 90 in accordance with the logical equation:

$$z = \bar{M}_1 R_1 R_2 \bar{T} \quad (12)$$

where all of the terms have previously been defined.

It will be seen from the logic expressed in Equations 11 and 12 that a positive increment occurs when the indications provided by the signals 150 change to a value corresponding to the indications provided by the signals 152. Positive increments are also obtained when the signals 152 change in amplitude at certain times that the signals 150 have a substantially constant amplitude. These positive increments occur when the signals 152 change to a level opposite to that provided by the signals 150. This will be described in detail in the subsequent paragraphs.

A positive increment is obtained when the signals 152 change from an indication of "0" to an indication of "1" at the time that the signals 150 still have an indication of "0." A change in the signals 150 from an indication of "0" to an indication of "1" to represent a positive increment is indicated at 160 in Figure 2. At the time that the signals 152 are changing from an indication of "0" to an indication of "1," a relatively high voltage is still produced on the right output terminal of the flip-flop 66. The flip-flop 66 still has a relatively high voltage on its right output terminal at such times since the control exerted by the flip-flop 60 over the operation of the flip-flop 66 is delayed by one clock cycle.

A signal passes through the "and" network 70 upon the simultaneous occurrence of relatively high voltages on the left output terminal of the flip-flop 60 and on the right output terminals of the flip-flops 34 and 66. This signal causes a relatively high voltage to be introduced to the "and" network 90 such that a signal passes through the "and" network at an optimum time in the clock cycles. The signal passes to the counter 92 to increase the indications in the counter by an integer. Signals pass through the "and" networks 70 and 90 to the counter 92 in accordance with the logical equation:

$$z = \bar{M}_2 R_2 \bar{R}_1 \bar{T} \quad (13)$$

where all of the terms have previously been defined.

A positive increment is also obtained when the signals 152 change from an indication of "1" to an indication of "0" at the time that the signals 150 still have an indication of "1." A change in the signals 152 from an indication of "1" to an indication of "0" to represent a positive increment is represented at 162 in Figure 2. At the time that the signals 152 change from an indication of "1" to an indication of "0," the flip-flop 66 still operates in its true state. The flip-flop 66 operates in its true state because of the delay of one clock cycle in the control exerted by the flip-flop 60 on the flip-flop 66.

The "and" network 72 passes a signal when relatively high voltages are simultaneously produced on the left output terminals of the flip-flops 34 and 66 and on the right output terminal of the flip-flop 60. This causes a signal to pass through the "and" network 90 to the counter 92 for increasing the indications in the counter by an integer. The indications in the counter 92 become increased by the passage of signals through the "and" networks 72 and 90 in accordance with the logical equation:

$$z = M_2 \bar{R}_2 R_1 \bar{T} \quad (14)$$

where all of the terms have previously been defined.

At certain times, signals representing negative increments may be introduced to the counter 92 to decrease the indications in the counter by an integer. For example, the signal 150 may change from an indication of "0" to an indication of "1" at the time that the signals 152 still have an indication of "0." A change in the signal 150 from an indication of "0" to an indication of "1" to represent a negative increment is indicated at 166 in Figure 2. At such a time, the flip-flop 38 is still operating in its false state since there is a delay of one clock cycle in the time at which the change in the operation of the flip-flop 34 produces a change in the operation of the flip-flop 38.

It will be seen from the previous paragraph that a negative increment occurs when relatively high voltages are simultaneously produced on the left output terminal of the flip-flop 34 and the right output terminals of the flip-flops 38 and 60. At such a time, a signal passes through the "and" network 100. The signal from the "and" network 100 is introduced through the "or" network 102 to the "and" network 104 for synchronization at an optimum time in the clock cycles. The signal then passes to the counter 92 to decrease the count in the counter by an integer. For example, the indications in the counter may decrease from a value of "6" to a value of "5" upon the passage of a signal through the "and" network 100, the "or" network 102 and the "and" network 104.

Signals pass through the "and" network 100, the "or" network 102 and the "and" network 104 to the counter 92 in accordance with the logical equation:

$$\bar{z} = \bar{M}_1 R_1 \bar{R}_2 T \quad (15)$$

where $\bar{z}$ = the introduction of a signal to the counter 92 in a direction for decreasing the indications in the counter by an integer; and the other terms have previously been defined.

A negative increment also occurs when the signals 150 change from an indication of "1" to an indication of "0" at the time that the signals 152 are provided with a substantially constant amplitude representing an indication of "1." Such a change in the signals 150 from an indication of "1" to an indication of "0" to represent a negative increment is indicated at 168 in Figure 2. At such a time, the flip-flop 38 has a true state of operation since the production of an indication of "0" in the flip-flop 34 is effective in triggering the flip-flop 38 to the false state of operation only after a delay of one clock cycle.

Signals pass through the "and" network 98 upon the simultaneous occurrence of relatively high voltages on the left output terminals of the flip-flops 38 and 60 and on the right output terminal of the flip-flop 34. These signals pass through the "or" network 102 and the "and" network 104 to the counter 92 and trigger the counter in a direction for decreasing the indications in the counter by an integer. Signals are introduced to the counter 92 through the stages 98, 102 and 104 in accordance with the logical equation:

$$\bar{z} = M_1 \bar{R}_1 R_2 \bar{T} \quad (16)$$

where all of the terms have previously been defined.

It will be seen from the above discussion that a negative increment is obtained when the indications provided by the signal 150 change to values opposite to those provided by the signal 152. In like manner, negative increments are obtained when the indications provided by the signal 152 change to values corresponding to those provided by the signal 150. For example, a negative increment is obtained when the signal 152 changes from an indication of "1" to an indication of "0" at the time that the signal 150 still has an indication of "0." A change in the signal 152 from an indication of "1" to an indication of "0" to represent a negative increment is indicated at 170 in Figure 2.

Upon the occurrence of a change corresponding to the change 170 in the signal 152, relatively high voltages are simultaneously produced on the right output terminals of the flip-flops 34 and 60. A relatively high voltage is produced at the same time on the left output terminal of the flip-flop 66 since the flip-flop becomes triggered to its false state by the change in the operation of the flip-flop 60 only after a delay of at least one clock cycle.

Because of the particular pattern of operation of the flip-flops 34, 60 and 66, a signal passes through the "and" network 94. This signal then passes through the "or" network 102 and the "and" network 104 and triggers the counter 92 in a direction for reducing the indications in the counter by an integer. Signals pass through the stages 94, 102 and 104 to the counter 92 in accordance with the logical equation:

$$\bar{z}=M_2\bar{R}_2\bar{R}_1\bar{T} \qquad (17)$$

where all of the terms have previously been defined.

A negative increment is also obtained when the signal 152 changes from an indication of "0" to an indication of "1" at the time that the signal 150 still has an indication of "1." A change in the signal 152 from an indication of "0" to an indication of "1" to represent a negative increment is indicated at 172 in Figure 2. At such a time, relatively high voltages are simultaneously produced on the left output terminals of the flip-flops 34 and 60 and on the right output terminal of the flip-flop 66. A relatively high voltage is produced on the right output terminal of the flip-flop 66 since a delay of at least one clock cycle occurs before the flip-flop 66 becomes triggered to the true state of operation by the change in the operation of the flip-flop 60 to the true state.

A signal passes through the "and" network 96 when relatively high voltages are simultaneously produced on the left output terminals of the flip-flops 34 and 60 and on the right output terminal of the flip-flop 66. This signal passes through the "or" network 102 and the "and" network 104 to the counter 92 and is instrumental in triggering the counter in a direction for reducing the indications in the counter by an integer. The counter 92 receives the signals passing through the stages 96, 102 and 104 in accordance with the logical equation:

$$\bar{z}=\bar{M}_2R_2R_1\bar{T} \qquad (18)$$

where all of the terms have previously been defined.

It has been previously described that the alternating signals 150 and 152 preferably have phase displacements of 90°. Actually, the phase displacement between the signals 150 and 152 can be different from 90°. For example, the phase displacement can sometimes be less than 90°. This would cause the last increment to occur at a time different from the time at which it should properly occur for optimum accuracy. Since this affects only the accuracy of the last increment, it would not produce a grievous error under many circumstances, especially where a considerable number of increments would be involved.

There is thus provided apparatus for operating on first and second alternating signals having a particular phase relationship with respect to each other and for operating on the alternating signals to indicate increments in the angular displacements of the alternating signals. The apparatus operates upon the alternating signals to produce a plurality of control signals and combines the control signals in various relationships to indicate positive and negative increments in the alternating signals. The apparatus operates to indicate the positive increments by producing output signals on one line and to indicate negative increments by producing output signals on a second line.

What is claimed is:

1. In an increment register, means for providing first alternating signals, means for providing second alternating signals having a frequency corresponding to that of the first alternating signals and having a phase displaced from that of the first alternating signals, a first bistable member having first and second states of operation, means including the first bistable member operative upon the first alternating signals to indicate the polarity of the alternating signals by the first and second states of operation, a second bistable member having first and second states of operation, means including the second bistable member operative upon the second alternating signals to indicate the polarity of the alternating signals by the first and second states of operation, a third bistable member having first and second states of operation, a fourth bistable member having first and second states of operation, means including the first and third bistable members for triggering the third bistable member in accordance with the operation of the first bistable member to co-operate with the first bistable member in indicating changes in the phase of the first alternating signals and the particular changes in the phase, means including the second and fourth bistable members for triggering the fourth bistable member in accordance with the operation of the second bistable member to co-operate with the second member in indicating the changes in the phase of the second alternating signals and the particular changes in the phase, means including the first, second, third and fourth bistable members for combining in particular patterns the signals produced by the bistable members to product first output signals representing positive increments, and means including the first, second, third and fourth bistable members for combining in particular patterns the signals produced by the bistable members to produce second output signals representing negative increments.

2. In an increment register, means for providing first alternating signals, means for providing second alternating signals having a frequency corresponding to that of the first alternating signals and having a phase displaced from that of the first alternating signals, first control means coupled electrically to one another and to the first alternating signal means for providing signals individually representing the polarity of the first alternating signals and collectively representing the particular changes in polarity of the alternating signals, second control means coupled electrically to one another and to the second alternating signal means for providing signals individually representing the polarity of the second alternating signals and collectively representing the particular changes in polarity of the alternating signals, a first plurality of "and" networks and "or" networks coupled electrically to the first and second control means for combining the signals from the first control means and the second control means in first particular patterns to produce first output signals representing positive increments upon the change of the first alternating signals from the first polarity to the second polarity during the occurrence of the first polarity in the second alternating signals and upon the change of the second alternating signals from the first polarity to the second polarity during the occurrence of the second polarity in the first alternating signals, and a second plurality of "and" networks and "or" networks coupled electrically to the first and second control means for combining the signals from the first control means and the second control means in second particular patterns to produce second output signals representing negative increments upon the change of the first alternating signals from the second polarity to the first polarity during the occurrence of the first polarity in the second alternating signals and upon the change of the second alternating signals from the first polarity to the second polarity during the occurrence of the first polarity in the first alternating signals.

3. In an increment register, means for providing first alternating signals, means for providing second alternating signals having the same frequency as the first alternating signals and having a particular phase displacement relative to the first alternating signals, means for providing clock signals having at any instant a frequency higher than the frequency of the first and second alternating signals, first means responsive to the first alternating signals and to the clock signals for sampling the amplitude of the first alternating signals at periodic intervals related to the frequency of the clock signals to produce first control signals at a frequency dependent upon the frequency of the clock signals during at least a first polarity in the alternating signals, second means responsive to the first control signals and to the clock signals for sampling the amplitude of the first control signals in accordance with the frequency of the clock signals to produce second control signals having an amplitude dependent upon the regularity of occurrence of the first control signals, third means responsive to the second alternating signals and to the clock signals for sampling the amplitude of the second alternating signals at periodic intervals related to the frequency of the clock signals to produce third control signals at a frequency dependent upon the frequency of the clock signals during at least a first polarity in the second alternating signals, fourth means responsive to the second control signals and to the clock signals for sampling the amplitude of the third control signals in accordance with the frequency of the clock signals to produce fourth control signals having an amplitude dependent upon the regularity of occurrence of the third control signals, means responsive to the first, second, third and fourth control signals for combining these control signals in first particular relationships to produce first output signals representing positive increments, and means responsive to the first, second, third and fourth control signals for combining these control signals in second particular relationships to produce second output signals representing negative increments.

4. In an increment register, means for providing first alternating signals, means for providing second alternating signals having a particular phase displacement relative to the first alternating signals, means for providing clock signals at a frequency higher than the frequency of the first and second alternating signals, means operative upon the first alternating signals and the clock signals to provide first control signals having amplitudes alternating between first and second levels during a first polarity in the alternating signals and having the second level during the opposite polarity in the alternating signals, means operative upon the first control signals and the clock signals to produce second control signals having a first amplitude during the alternation of the first control signals between the first and second amplitude and having a second amplitude during the period in which the second amplitude level is being produced in the first control signals, means operative upon the second alternating signals and the clock signals to provide third control signals having amplitudes alternating between first and second levels during a first polarity in the alternating signals and having the second level during the opposite polarity in the alternating signals, means operative upon the third control signals and the clock signals to produce fourth control signals having a first amplitude during the alternations of the third control signals between the first and second amplitudes and having a second amplitude during the period in which the second amplitude level is being produced in the third control signals, means operative upon the first, second, third and fourth control signals for combining these signals in first particular relationships to provide first output signals representing increments of one polarity in the alternating signals, and means operative upon the first, second, third and fourth control signals for combining these signals in second particular relationships to provide second output signals representing increments of an opposite polarity in the alternating signals.

5. In an increment register, means for providing first alternating signals, means for providing second alternating signals having at any instant the same frequency as the first alternating signals and having a particular phase displacement relative to the first alternating signals, means for providing clock signals having a frequency higher than the frequency of the alternating signals, means including at least one "and" network coupled electrically to the clock signal means and to the first alternating signal means for sampling the amplitude of the first alternating signals at periodic intervals related to the frequency of the clock signals to produce first control signals having characteristics alternating at a frequency dependent upon the frequency of the clock signals and for producing the alternating characteristics in the first control signals during at least a first polarity in the alternating signals, means including at least one "and" network coupled electrically to the first control signal means and to the clock signal means for sampling the first control signals in accordance with the frequency of the clock signals to produce second control signals having first characteristics during the production of the alternating characteristics in the first control signals and having second characteristics at the other times in the alternating signals, means including at least one "and" network coupled electrically to the clock signal means and to the second alternating signal means for sampling the amplitude of the second alternating signals at periodic intervals related to the frequency of the clock signals to produce third control signals having characteristics alternating at a frequency dependent upon the frequency of the clock signals and for producing the alternating characteristics in the third control signals during at least a first polarity in the second alternating signals, means including at least one "and" network coupled electrically to the third control signal means and to the clock signal means for sampling the third control signals in accordance with the frequency of the clock signals to produce forth control signals having first characteristics during the production of the alternating characteristics in the third control signals and having second characteristics at the other times in the second alternating signals, means including a plurality of "and" networks coupled electrically in a first particular relationship to the first, second, third and fourth control signal means for sampling the first, second, third and fourth control signals to produce first output signals representing positive increments in the alternating signals, and means including a second plurality of "and" networks coupled electrically in a second particular relationship to the first, second, third and fourth control signal means for sampling the first, second, third and fourth control signals to produce second output signals representing negative increments in the alternating signals.

6. In an increment register, means for providing first alternating signals, means for providing second alternating signals having the same frequency as the first alternating signals and a phase displacement relative to the first alternating signals, means for providing clock signals having a frequency higher than the frequency of the first and second alternating signals, electrical circuitry including a first bistable member operative upon the first alternating signals and the clock signals to provide first control signals having changes in characteristics at a frequency related to the frequency of the clock signals during one polarity of the alternating signals and having substantially stable characteristics during at least the other polarity of the alternating signals, electrical circuitry including a second bistable member operative upon the first control signals and the clock signals to provide second control signals having a first amplitude continued until the interruption in the regularity of the changes in the first control signals and having a second amplitude during the stable characteristics in the first control signals, electrical circuitry including a second bistable member operative upon the second alternating signals and the clock signals to provide third control signals having changes in characteristics at a frequency related to the frequency of the clock signals during one polarity of the alternating signals and having substantially stable characteristics during the other polarity of the second alternating signals, electrical circuitry including a fourth bistable member operative upon the third control signals and the clock signals to provide fourth control signals having a first amplitude continued until the interruption in the regularity of the changes in the third control signals and having a second amplitude during the stable characteristics in the third control signals, electrical circuitry including a plurality of "and" networks and an "or" network operative upon the first, second, third and fourth control signals in first particular relationships to provide first output signals representing positive increments, and electrical circuitry including a second plurality of "and" networks and an "or" network operative upon the first, second, third and fourth control signals in second particular relationships to provide second output signals representing negative increments.

7. In an increment register, means for providing first alternating signals, means for providing second alternating signals having the same frequency as the first alternating signals and a phase displacement relative to the first alternating signals, means for providing clock signals at a frequency higher than the frequency of the first and second alternating signals, means including at least a first "and" network and a first bistable member operative upon the first alternating signals and the clock signals to produce in the bistable member first control signals having first and second amplitudes during successive clock signals upon the occurrence in the first alternating signals of amplitudes differing in a first respect from a particular value and having the second amplitude during successive clock signals upon the occurrence in the first alternating signals of amplitudes differing in a second respect opposite to the first respect from the particular value, means including at least a second "and" network and a second bistable member operative upon the first control signals and the clock signals to produce in the second bistable member second control signals having a first amplitude a particular number of clock signals after the initiation in the production of the alternating characteristics in the amplitudes of the first control signals and having a second amplitude a particular number of clock signals after the initiation in the production of the second amplitude in the first control signals during successive clock signals, means including at least a third "and" network and a third bistable member operative upon the second alternating signals and the clock signals to produce in the third bistable member third control signals having first and second amplitudes during successive clock signals upon the occurrence in the second alternating signals of amplitudes differing in a first respect from a particular value and having the second amplitude during successive clock signals upon the occurrence in the second alternating signals of amplitudes differing in a second respect opposite to the first respect from the particular value, means including at least a fourth "and" network and a fourth bistable member operative upon the third control signals and the clock signals to produce in the fourth bistable member fourth control signals having a first amplitude a particular number of clock signals after the initiation in the production of the alternating characteristics in the amplitudes of the third control signals and having a second amplitude a particular number of clock signals after the initiation in the production of the second amplitude in the third control signals during successive clock signals, means including a first plurality of "and" networks responsive to the signals from first particular combinations of three of the four bistable members to pass signals upon the occurrence of the particular patterns of operation of these bistable members and in representation of positive increments and including a first "or" network for passing the signals from the "and" networks in the first plurality, and means including a second plurality of "and" networks responsive to the signals from second particular combinations of three of the four bistable members to pass signals upon the occurrence of the particular patterns of the operation of these bistable members and in representation of negative increments and including a second "or" network for passing the signals from the "and" networks in the second plurality.

References Cited in the file of this patent

UNITED STATES PATENTS

| | | |
|---|---|---|
| 2,656,106 | Stabler | Oct. 20, 1953 |
| 2,685,082 | Beman | July 27, 1954 |
| 2,700,149 | Stone | Jan. 18, 1955 |
| 2,733,430 | Steele | Jan. 31, 1956 |
| 2,776,418 | Townsend | Jan. 1, 1957 |
| 2,926,335 | Bower | Feb. 23, 1960 |